M. J. OSSMAN.
COMBINATION GLAZIER'S TOOL.
APPLICATION FILED APR. 24, 1917.

1,264,430.

Patented Apr. 30, 1918.

Witness

Inventor
M. J. Ossman

Attorney

UNITED STATES PATENT OFFICE.

MICHAEL J. OSSMAN, OF LEADVILLE, COLORADO.

COMBINATION GLAZIER'S TOOL.

1,264,430.             Specification of Letters Patent.        Patented Apr. 30, 1918.

Application filed April 24, 1917. Serial No. 164,215.

*To all whom it may concern:*

Be it known that I, MICHAEL J. OSSMAN, a citizen of the United States, residing at Leadville, in the county of Lake and State of Colorado, have invented a new and useful Combination Glazier's Tool, of which the following is a specification.

The present invention appertains to combination tools, and aims to provide a tool of that character adapted especially for use by glaziers, the present implement being useful as a putty knife, glass cutter, putty gouger, tack puller, and hammer for glazier's points.

It is the object of the invention to combine in one implement the elements specified, to render the same practical and efficient in use, the implement also being simple in construction and foldable in the manner of a pocket-knife to be readily carried.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1:
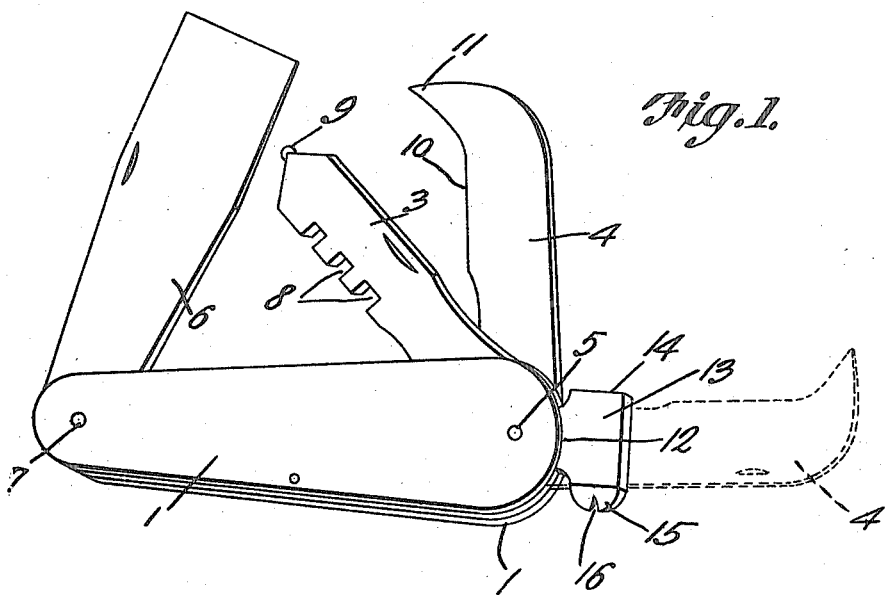
Figure 1 is a perspective view of the implement with the parts partially swung open.
Figure 2:
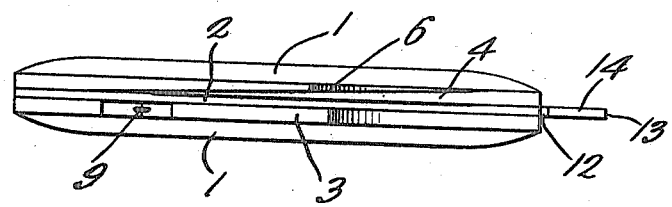
Fig. 2 is an elevation of the implement with the parts folded.

The tool embodies a stock or handle adapted to be conveniently carried and handled, the same comprising the longitudinal side pieces 1 and longitudinal partition 2 intermediate them. A glass cutter blade 3 and putty gouger blade 4 are pivoted between the partition 2 and side pieces 1, as at 5, at one end of the handle, and a putty knife blade 6 is pivoted, as at 7, between the partition and one side piece at the other end of the handle, said blades being swingable into the handle, as seen in Fig. 2, when not in use. The glass cutter blade 3 has notches 8 in one edge for breaking or chipping glass, and the blade 3 has a glass cutting wheel or element 9 at its free end. The gouging blade 4 has the sharp edge 10 and its free end is curved into a bill 11, projecting in the direction toward which the sharp edge 10 projects. The putty blade 6 increases in width from its pivoted to its free end, and is used for applying and working the putty when the blade 6 is swung outwardly into alinement with the handle. Any one of the blades can be readily swung outwardly into alinement with the handle beyond one end thereof, to be used conveniently.

That end of the partition 2 between the blades 3 and 4 is provided with a reduced shank 12 projecting longitudinally therefrom, and said shank has a transversely elongated or T-head 13, one end of which has a face 14 to provide a hammer. The other end of the hammer head 13 has a rounded lip 15 provided with a tapered notch 16 to provide a tack puller claw which is in the plane of the relatively flat head 13. When the blades 3 and 4 are swung within the handle, the hammer head 13 can be readily used for hammering glaziers' points, and can also be used for pulling tacks and similar securing elements. It is also to be noted that when either of the blades 3 and 4 is swung open, it will overlap and frictionally engage the head 13 to steady the blade, and the handle can be so held that the head 13 will press against the opened blade in order to better manipulate the implement.

Having thus described the invention, what is claimed as new is:—

A compound tool comprising side pieces, a partition between the side pieces and provided at one end with a projection having a tack-receiving notch in one of its lateral edges, and a blade pivoted between the partition and one side piece and foldable into the handle, the free end of the blade constituting a fulcrum when the blade is open and when the notch is in use, the projection bearing against the side of the blade when the blade is open and when the free end of the blade forms a fulcrum, thereby to reinforce the blade.

In testimony that I claim the foregoing as my own, I have hereto affixed my signature in the presence of two witnesses.

MICHAEL J. OSSMAN.

Witnesses:
MARGUERITE DE LANEY,
JOHN J. MITCHELL.